March 22, 1966 J. C. STORM ETAL 3,241,324
MOBILE MARINE PLATFORM APPARATUS
Filed Dec. 24, 1962 13 Sheets-Sheet 1

Fig. 1

INVENTORS
James C. Storm
Julian O. Crooke
John C. Estes
James E. Steele

INVENTORS
James C. Storm
Julian O. Crooke
John C. Estes
James E. Steele

INVENTORS
James C. Storm
Julian O. Crooke
John C. Estes
James E. Steele

March 22, 1966  J. C. STORM ETAL  3,241,324
MOBILE MARINE PLATFORM APPARATUS
Filed Dec. 24, 1962  13 Sheets-Sheet 9

INVENTORS
James C. Storm
Julian O. Crooke
John C. Estes
James E. Steele

Fig.15

March 22, 1966 J. C. STORM ETAL 3,241,324
MOBILE MARINE PLATFORM APPARATUS
Filed Dec. 24, 1962 13 Sheets-Sheet 13

INVENTORS
James C. Storm
Julian O. Crooke
John C. Estes
James E. Steele

United States Patent Office 3,241,324
Patented Mar. 22, 1966

3,241,324
MOBILE MARINE PLATFORM APPARATUS
James C. Storm, Corpus Christi, and Julian O. Crooke and John C. Estes, Beaumont, Tex., and James E. Steele, Hingham, Mass., assignors to Bethlehem Steel Corporation, a corporation of Delaware
Filed Dec. 24, 1962, Ser. No. 246,698
14 Claims. (Cl. 61—46.5)

This invention relates generally to mobile marine platform apparatus, and specifically, to a useful-load-carrying primary structure which is completely, independently and at all times stable, whether afloat, grounded on the marine floor, or in transit from the floating position to the grounded position or from the grounded position to the floating position, which apparatus includes a non-floating operating stage adjustably mounted to the primary structure and of variable height above the marine floor.

The apparatus of this invention is particularly useful for exploration and exploitation of petroleum deposits in submerged lands in a wide range of water depths. As is well-known in the art, structures for marine drilling of oil wells have long been employed in offshore locations in the Gulf of Mexico, as well as in many other similar areas. The current trend is towards exploration in deeper waters than heretofore encountered, and present designs leave much to be desired for operations in water depths ranging upwards of 300 feet.

Waters in locations such as the Gulf of Mexico are subjected to hurricanes and other disturbances which cause marked fluctuations in the water surface. Good engineering practice dictates, therefore, that the platform from which drilling operations are performed be elevated above the highest reasonably-anticipated wave height for the marine area under consideration. Good engineering practice further dictates that the platform from which drilling operations are performed be no higher than necessary to clear these highest reasonably-anticipated wave heights, as excessive heights create certain drilling problems which need not be discussed in this specification. On the basis of several years' operating experience out in the Gulf of Mexico, it can be stated that, as a practical matter, the clearance between the bottom of the platform from which drilling operations are performed and mean water level should be approximately 50 feet in such areas.

The problem has been to develop mobile marine platform apparatus which meets the foregoing criteria, which is suitable for use in a wide range of water depths, and which possesses complete stability at all times independent of auxiliary pontoons or of the characteristics of the soil underlying the marine floor.

Many designs for mobile marine apparatus have been proposed. Some of these designs have been incorporated in actual working structures used in the Gulf of Mexico and in other submerged areas. Many of these designs have been recognized as impractical and have never been incorporated in any physical structure.

One type of mobile marine apparatus is the "fixed deck" barge, wherein the operating platform from which drilling operations are performed is mounted through a framework to a floating barge, the elevation of the operating platform above the barge being invariable. As the barge is submerged below the water, the elevation of the operating platform above the water surface will decrease; when the barge is grounded on the marine floor in water depths for which the apparatus is designed, the operating platform will reach the desired elevation above the surface of the water. Obviously, this type of apparatus will provide the proper wave clearance in only one depth of water and, if proper wave clearance is the criterion, this type of apparatus is completely unsuited for use in any substantial range of water depths, as the operating platform will be too high above mean water level in water depths less than that for which the structure is designed, and will not be high enough above mean water level in water depths greater than that for which the structure is designed.

Another type of mobile marine apparatus, providing some advantages over the "fixed deck" barge, and permitting proper wave clearance below the operating platform in waters of varying depths, is the well-known "two-boat" apparatus. In this type of structure, columns secured to a lower hull slidably extend through an upper hull which latter is also the platform from which drilling operations are performed. Jacking mechanisms on the upper hull or operating platform act on the columns to vary the spacing between the two hulls. The apparatus is floated to location with the two hulls drawn together, one or both hulls providing the requred buoyancy. At location, the lower hull is submerged and grounded on the marine floor; then, the upper hull is jacked out of the water to the proper elevation above mean water level. In this type of apparatus, the source of stability shifts from one hull to the other at various times; stability for the entire structure is provided by the upper hull when the lower hull is being submerged; after the lower hull is grounded and as the upper hull is jacked out of the water, the source of stability for the entire structure shifts from the upper hull to the lower hull; in relocating the apparatus, after the upper hull is lowered to the water surface and as the lower hull is raised from the marine floor, the source of stability for the entire structure shifts from the lower hull to the upper hull. It is important to note that, in this type of apparatus, the dimensions of the upper hull are determined, not only by the requirements of the drilling operation, but also by the amount of floating stability that is required of the upper hull during setting-up and relocating the apparatus. Generally speaking, the greater the water depth in which the apparatus is to be used, the greater will be the dimensions, and hence the weight, of the upper hull; therefore, the duty of the jacking mechanisms will also increase. Parenthetically, the space on the upper hull or operating platform required for the actual drilling operation will not increase proportionally or perhaps even significantly.

The present invention provides a mobile marine apparatus which meets all the criteria hitherto mentioned in that the operating platform or stage is positionable at the proper elevation above mean water level in a wide range of water depths, and the source of stability for the complete apparatus does not shift from one element to another but rather resides at all times in one principal structure or element and never in the operating stage. Moreover, the duty of the jacking mechanisms is determined solely by the weight and dimensions of the operating stage as fixed by the requirements of the drilling operation, and not by the weight and dimensions of such operating stage as determined by considerations of stability rather than the drilling operation.

Briefly, the present invention comprises a number of buoyant, ballastable columns of length greater than the greatest water depth in which the apparatus is intended to operate, a base structure integrating the lower ends of all of the columns, and a useful-load-carrying superstructure integrating the upper ends of all of the columns, the elements just enumerated constituting a primary structure, and an operating stage adjustably mounted to the primary structure below the superstructure and of variable elevation relative thereto.

One of the objects of this invention is to provide improved mobile marine apparatus for petroleum exploration in submerged areas.

Another object of this invention is to provide mobile marine apparatus for use in offshore areas in a wide range of water depths.

A further object of this invention is to provide mobile marine apparatus for use in offshore areas in a wide range of water depths and wherein the operating stage is always positioned at a proper, but not excessive, elevation above the mean water level.

Yet another object of this invention is to provide mobile marine apparatus for use in offshore areas, the source of stability for the complete apparatus residing completely and at all times in one principal structure or element and not shifting between or among several separate elements of the apparatus.

Still another object of this invention is to provide mobile marine apparatus for use in offshore areas which, because of its open construction, can be operated while in floating condition, with a minimum of pitching, tossing or rolling due to wave and wind forces.

Still another object of this invention is to provide mobile marine apparatus for use in offshore areas in a wide range of water depths, comprising a useful-load-carrying primary structure which is completely, independently and at all times stable, whether afloat, grounded on the marine floor, or in transit from the floating position to the grounded position or from the grounded position to the floating position, and a non-floating operating stage mounted thereto and of variable elevation relative thereto and to the marine floor.

Still a further object of this invention is to provide mobile marine apparatus for use in offshore areas in a wide range of water depths, comprising a completely stable primary structure and an operating stage adjustably mounted thereto through jacking mechanisms, the duty of the jacking mechanisms being determined solely by the requirements of the drilling operation as affecting the dimensions and weight of the operating stage.

Other and further objects of this invention will become apparent during the course of the following specification and by reference to the accompanying drawings in which like numerals represent like parts in the several views. It is to be understood that, where mean water level is indicated in these several views, the location thereof relative to other parts in the views is shown only approximately.

Referring now to FIGURES 1-4, the mobile marine apparatus shown therein is seen as comprising primary structure 1 and operating stage 2 adjustably mounted thereto through suspension members 3. Primary structure 1 is composed of inclined, buoyant, ballastable columns 4, a base structure 5 integrating the lower ends of columns 4, and a useful-load-carrying superstructure 6 integrating the upper ends of columns 4. It will be noted that in this embodiment of the apparatus, there are three columns 4 in the primary structure 1, that these three columns 4 are inclined to provide a broad lower end to primary structure 1, that the useful-load-carrying superstructure 6 is triangular and open-centered in plan, that the operating stage 2 is generally triangular in plan, that the operating stage 2 is nestable in said useful-load-carrying superstructure 6, and that the opening in the useful-load-carrying superstructure 6 exposes practically the entire upper deck of the operating stage 2, which opening affords communication between the upper decks of the useful-load-carrying superstructure 6 and operating stage 2.

Figure 1:
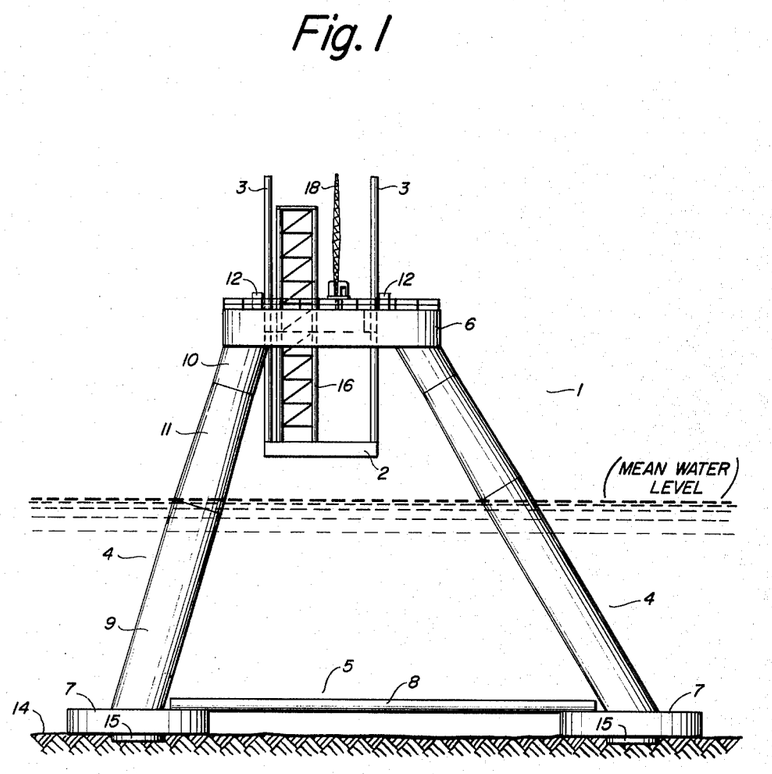
FIGURE 1 represents a side elevation of the apparatus of this invention, showing the apparatus set up for drilling operations at a marine site with the elevation of the operating stage adjusted relative to mean water level to provide proper clearance.
Figure 2:
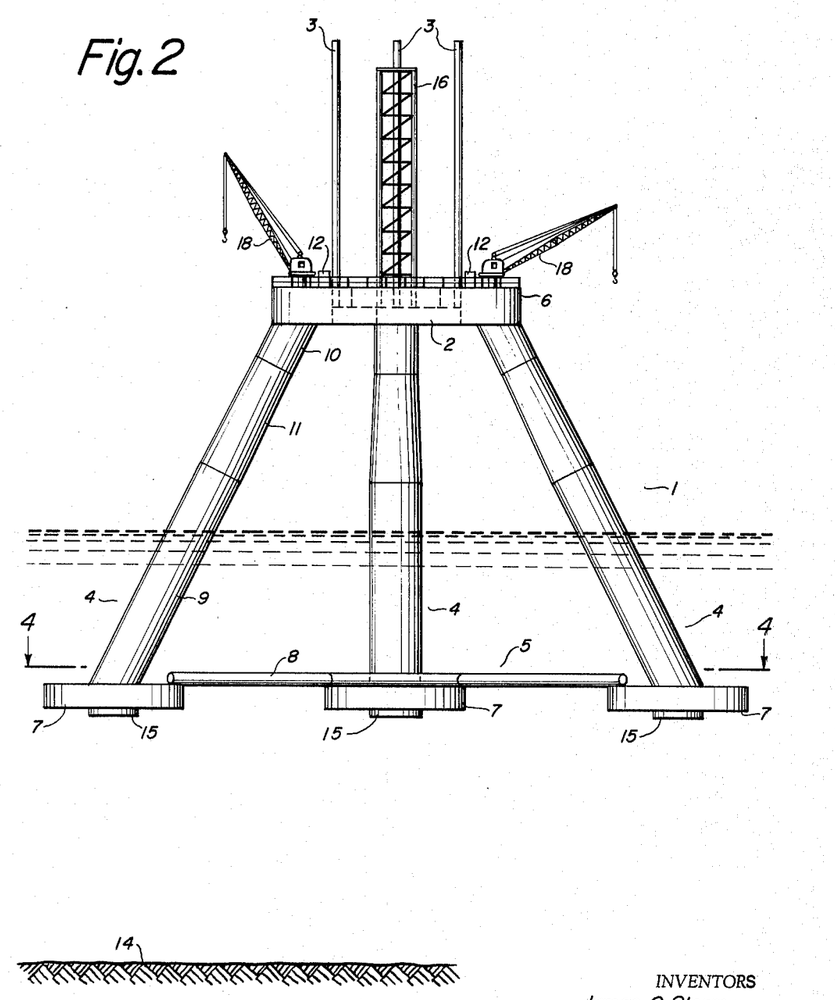
FIGURE 2 represents an end elevation of the apparatus of FIGURE 1, showing the apparatus afloat and with the operating stage elevated to nest in the superstructure.
Figure 3:
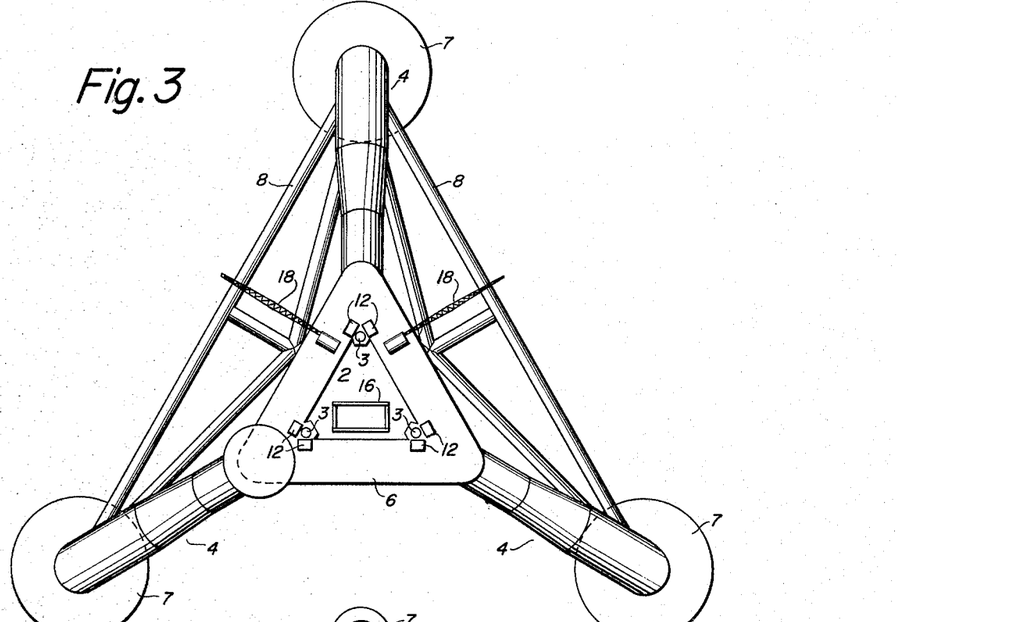
FIGURE 3 represents a view in plan of the apparatus of FIGURES 1 and 2.
Figure 4:
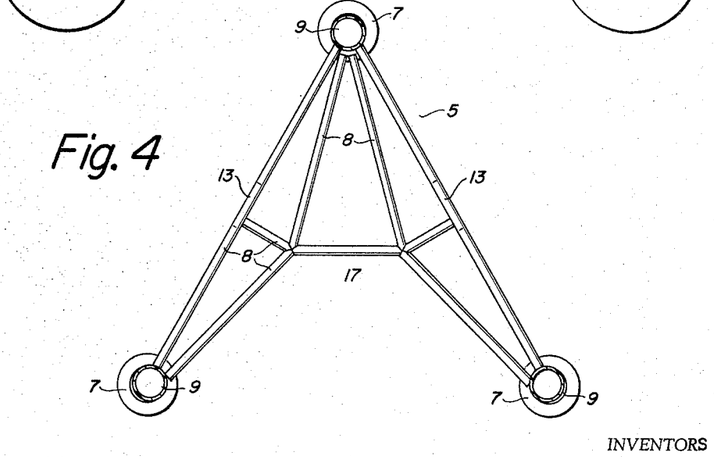
FIGURE 4 represents a section in plan of the apparatus of FIGURES 1 and 2, taken along the line 4—4 of FIGURE 2, and slightly reduced in scale.
Figure 5:
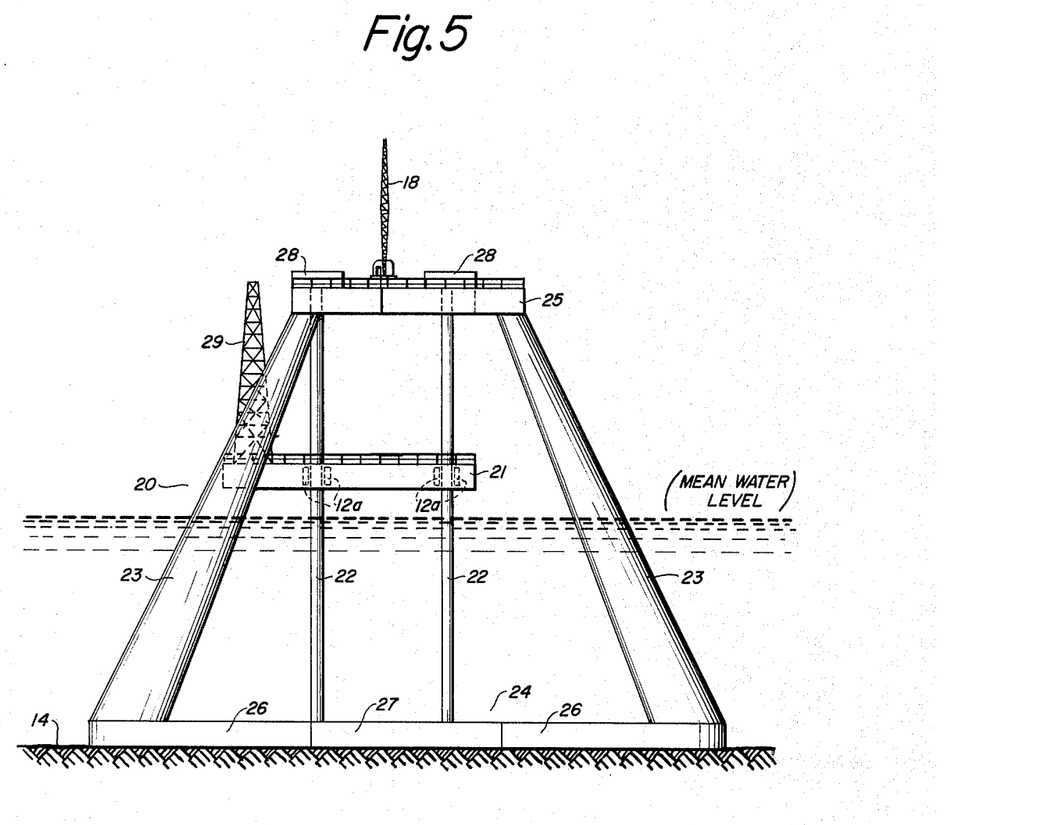
FIGURE 5 represents a side elevation of a modification of the apparatus of this invention, showing the modified apparatus set up for drilling operations at a marine site with the elevation of the operating stage adjusted relative to mean water level to provide proper clearance.
Figure 6:
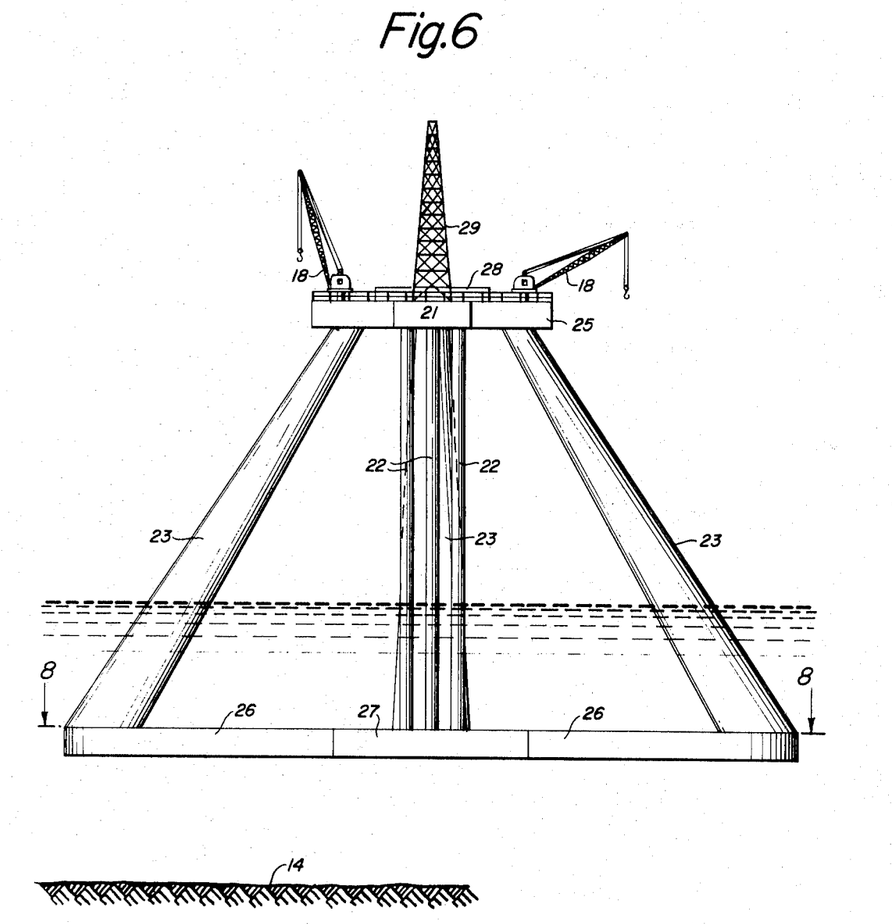
FIGURE 6 represents an end elevation of the modified apparatus of FIGURE 5, showing the apparatus afloat and with the operating stage elevated to nest in the superstructure.
Figures 7, 8:
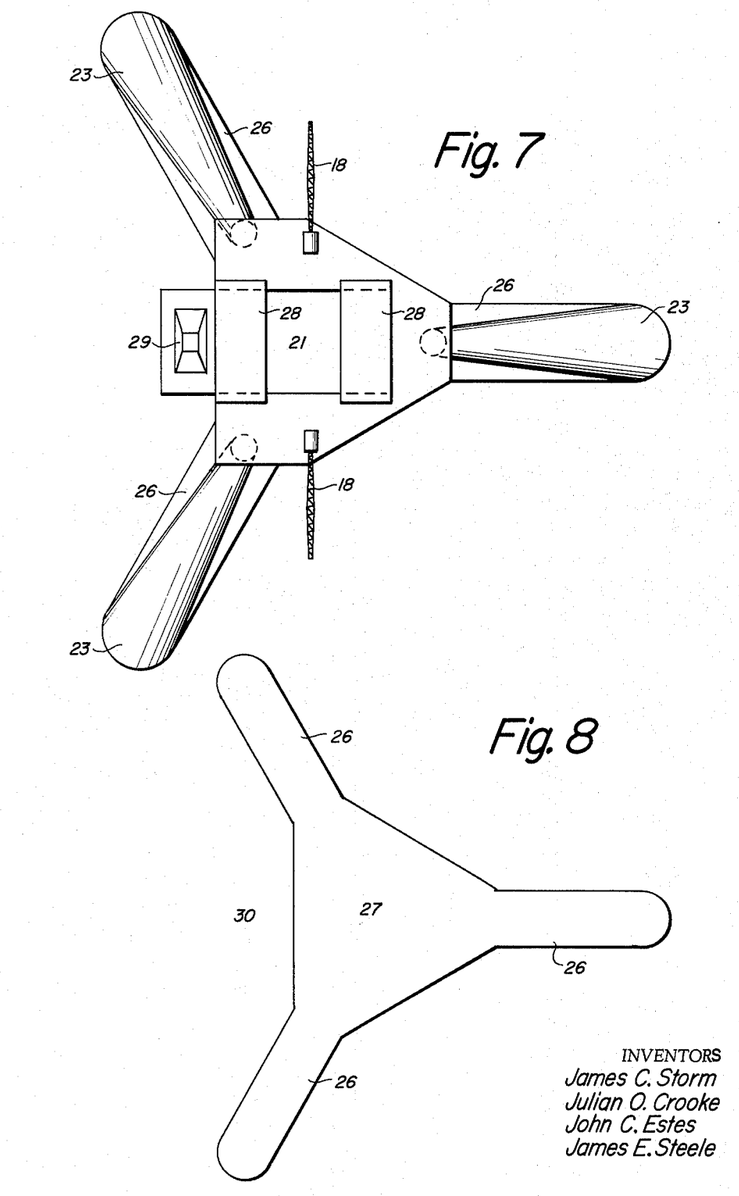
FIGURE 7 represents a view in plan of the modified apparatus of FIGURES 5 and 6.
FIGURE 8 represents a section in plan of the modified apparatus of FIGURES 5 and 6, taken along the line 8—8 of FIGURE 6.
Figure 9:
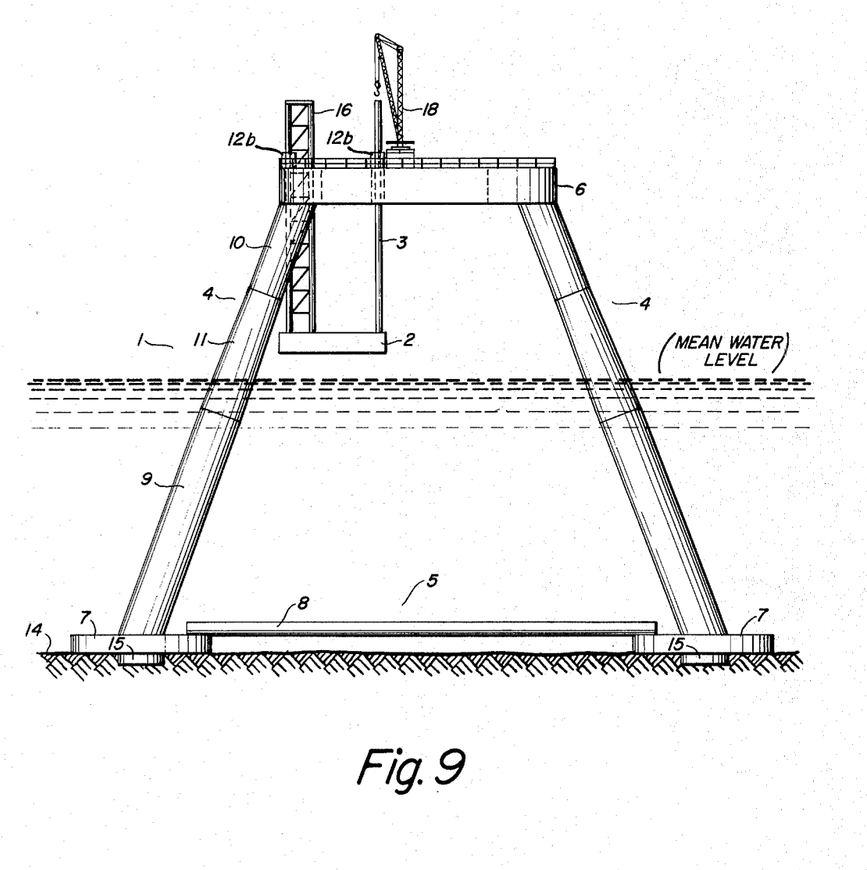
FIGURE 9 represents a side elevation of another modification of the apparatus of this invention, showing the modified apparatus set up for drilling operations at a marine site with the elevation of the operating stage adjusted relative to mean water level to provide proper clearance.
Figure 10:
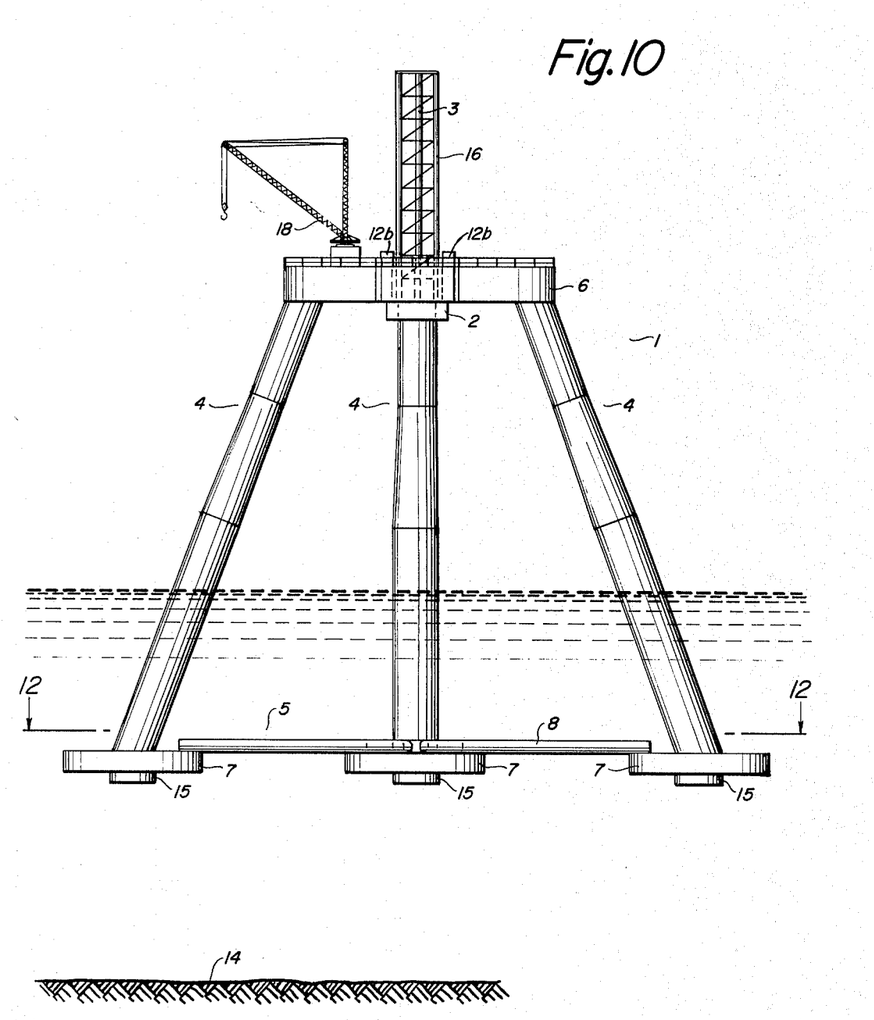
FIGURE 10 represents an end elevation of the modified apparatus of FIGURE 9, showing the apparatus afloat and with the operating stage elevated to its uppermost position.

Base structure 5 is composed of cylindrical, buoyant, ballastable tanks 7 and tubular members 8 framed together as best shown in FIGURE 4.

Columns 4 are composed of a lower tubular portion 9, an upper tubular portion 10 of smaller diameter than lower tubular portion 9, and a tapered, tubular transition portion 11.

Means for selectively and controllably ballasting and deballasting columns 4 and tanks 7 are so well known in the art that they need not be described in detail herein except to mention that any suitable such means may be employed with the apparatus of this invention.

Jacking mechanisms 12 are mounted on useful-load-carrying superstructure 6 adjacent the apices of the triangular open center thereof and operate on the suspension members 3 to raise or lower operating stage 2 relative to the primary structure 1. These jacking mechanisms 12 may be any one of a number of types of jacking mechanisms well known in the art and are not described in detail herein, the said jacking mechanisms 12 being shown only generally in the drawings.

In large structures of this type, buoyancy compartments 13 may be provided adjacent the midportions of the longer tubular members 8 to prevent excessive deflection thereof and, if desired, the amount of buoyancy therein may be adjusted by any suitable means.

Preferably, spud members 15 are mounted centrally and to the undersides of tanks 7. These spud members 15, which may register vertically with the bottom of columns 4 thereabove, provide additional resistance to forces tending to shift the apparatus laterally along the marine floor 14 when the apparatus is grounded thereon. These spud members 15 also reduce or eliminate the possibility of high points on marine floor 14 bearing against the periphery of tanks 7 with such force as to cause undesirable stresses at the junction of said tanks 7 and columns 4.

As the apparatus is intended primarily for petroleum exploration and exploitation, operating stage 2 is provided with derrick structure 16. In this regard, it will be noted that tubular members 8 of the base structure 5 are arranged so as to define a working area or recess 17 inwardly of the least periphery of the base structure 5 (i.e., within the simple triangle having as its apices tanks 7, in the embodiment shown), and that the operating stage 2 is positioned over this working area or recess 17 and within the least periphery of the base structure 5.

Useful-load-carrying superstructure 6 is, as its name suggests, more than just a means of integrating the upper portions of columns 4. It provides a work area for those operations associated with the drilling function which do not have to be located adjacent the derrick structure 16 or elsewhere on operating stage 2. It provides a storage area for supplies needed for the drilling operation. Whirley cranes 18 (shown only in FIGURE 3), or similar handling apparatus, are mounted on useful-load-carrying superstructure 6 and are used to transfer supplies between a supply vessel (not shown) and the apparatus or between the useful-load-carrying superstructure 6 and the operating stage 2 therebelow. It will be noted that the duty of jacking mechanism 12 is determined essentially by the amount and weight of those items of equipment and supplies, associated with the drilling function, which must be located within the immediate vicinity of the derrick structure 16, and not by the amount and weight of all equipment and supplies associated with the drilling function as in the "two boat" type of apparatus heretofore described.

In operation, the apparatus is floated to location on the buoyancy of the primary structure 1, operating stage 2 being carried at any desired elevation including that position in which it is nested in useful-load-carrying superstructure 6 and any other suitable un-nested position below the said useful-load-carrying superstructure 6. It shall, for the immediate purpose, be assumed that operating stage 2 is carried in the nested position. At the drilling site, ballast is introduced into the primary structure 1 which commences to submerge, the addition of ballast thereto continuing until the primary structure 1 is properly grounded on marine floor 14. While the primary structure 1 is in transit between the surface of the water and the marine floor 14, columns 4 act as stability towers in that they provide adequate water-plane area to prevent the apparatus from capsizing. When the apparatus is finally grounded, it "sits" (i.e., is stabilized) on marine floor 14. Thereafter, jacking mechanisms 12 are actuated to lower operating stage 2 to the proper elevation above mean water level. To refloat and relocate the apparatus, the foregoing sequence of operations is, essentially, reversed. It is, however, not necessary to elevate operating stage 2 to its nested position, or even to shift its elevation relative to the primary structure 1, in this refloating operation. It is apparent, from the foregoing, that the stability of the entire apparatus resides completely and at all times in the primary structure 1 and does not shift between the primary structure 1 and the operating stage 2. It is also apparent, in view of the foregoing, that the jacking mechanisms 12 are not operated in connection with grounding and refloating operations.

Referring now to FIGURES 5–8, the modification of mobile marine apparatus shown therein is seen as comprising primary structure 20 and operating stage 21 adjustably mounted thereto on guide members 22. Primary structure 20 is composed of inclined, buoyant, ballastable columns 23, a buoyant, ballastable base structure 24 integrating the lower ends of columns 23, and a useful-load-carrying superstructure 25 integrating the upper ends of columns 23. In this embodiment of the apparatus, there are three columns 23 in the primary structure 20, these three columns are inclined to provide a broad lower end to the primary structure 20, the operating stage 21 is nestable in the useful-load-carrying superstructure 25, and there is a vertical opening in said useful-load-carrying superstructure 25 through which a substantial portion of the operating stage 21 is exposed, which opening affords communication between the upper decks of the useful-load-carrying superstructure 25 and operating stage 21.

Base structure 24 is composed of three horizontal arms 26 radiating from a central portion 27.

Columns 23 decrease in diameter in an upward direction.

Means for selectively and controllably ballasting and deballasting columns 23 and base structure 24 are so well known in the art that they need not be described in detail herein except to mention that any suitable such means may be employed with this modification of mobile marine apparatus.

Jacking mechanisms 12a are mounted on operating stage 21 and operate on guide members 22 to raise or lower operating stage 21 relative to the primary structure 20. As shown in the drawings, guide members 22 are secured at their lower ends to central portion 27 of base structure 24 and are secured at their upper ends to cross-beams 28 mounted to useful-load-carrying superstructure 25. These jacking mechanisms 12a may be any one of a number of types of jacking mechanisms well known in the art and are not described in detail herein, the said jacking mechanisms 12a being shown only generally in the drawings.

The apparatus being intended primarily for drilling operations, derrick structure 29 is provided at one end of operating stage 21, which overlies working area or recess 30, which in turn extends inwardly of the least periphery of the base structure 24.

Useful-load-carrying superstructure 25 is provided with Whirley cranes 18 (shown only in FIGURE 7) or the like.

The operation of the modified apparatus of FIGURES 5–8 is the same as that disclosed for the apparatus of FIGURES 1–4.

Referring now to FIGURES 9–12, a further modification of mobile marine apparatus is shown therein as comprising essentially the same elements as the apparatus of FIGURES 1–4, the salient differences being the arrangement of derrick structure 16 relative to the useful-load-carrying superstructure 6 and the jacking mechanisms 12b, and the shape of operating stage 2 (which is rectangular rather than triangular).

Figure 11:
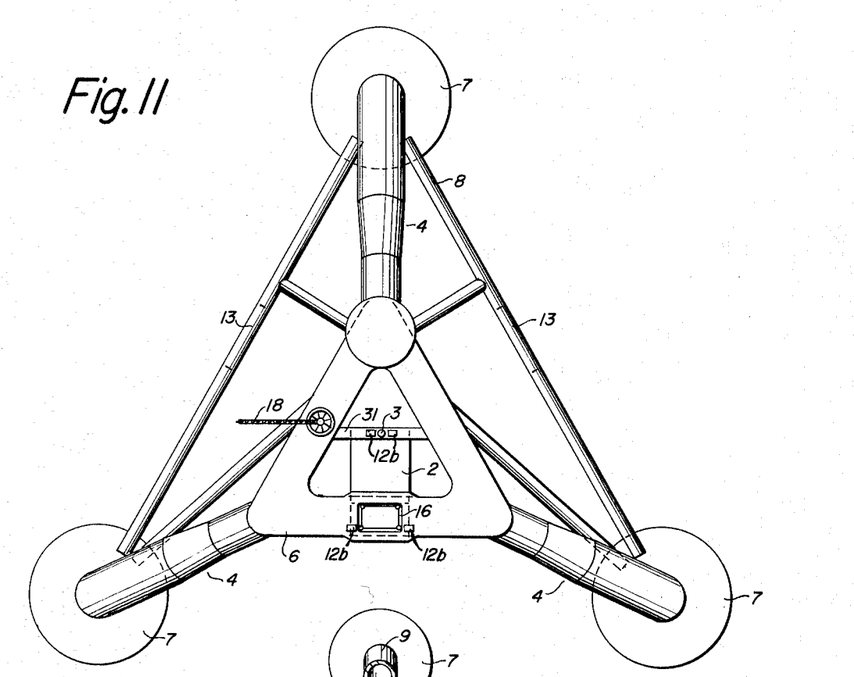
FIGURE 11 represents a view in plan of the modified apparatus of FIGURES 9 and 10.
Figure 12:
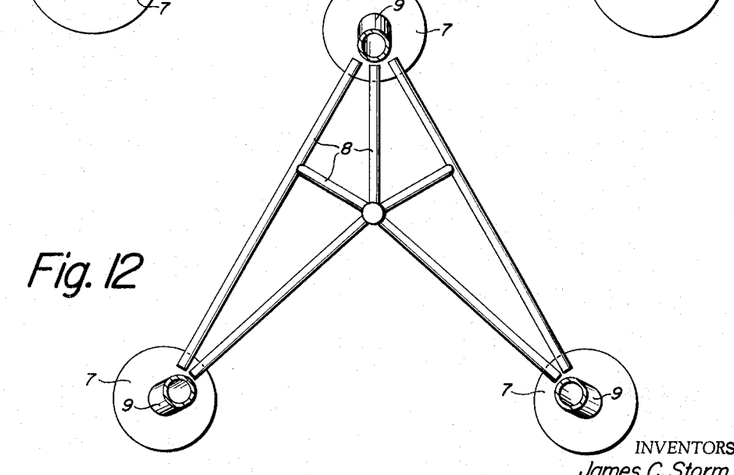
FIGURE 12 represents a section in plan of the modified apparatus of FIGURES 9 and 10, taken along the line 12—12 of FIGURE 10 and slightly reduced in scale.

Derrick structure 16 passes through an opening in the decks of useful-load-carrying superstructure 6. Jacking mechanisms 12b on said useful-load-carrying superstructure 6 operate on the two outside legs of derrick structure 16 as shown in FIGURE 11 (or on all four legs thereof if desired) in conjunction with jacking mechanisms 12b on cross-beam 31, which latter jacking mechanisms 12b operate on suspension member 3. Cross-beam 31 is secured to useful-load-carrying superstructure 6.

The operation of the modified mobile marine apparatus of FIGURES 9–12 is the same as that of FIGURES 1–4.

Figure 13:
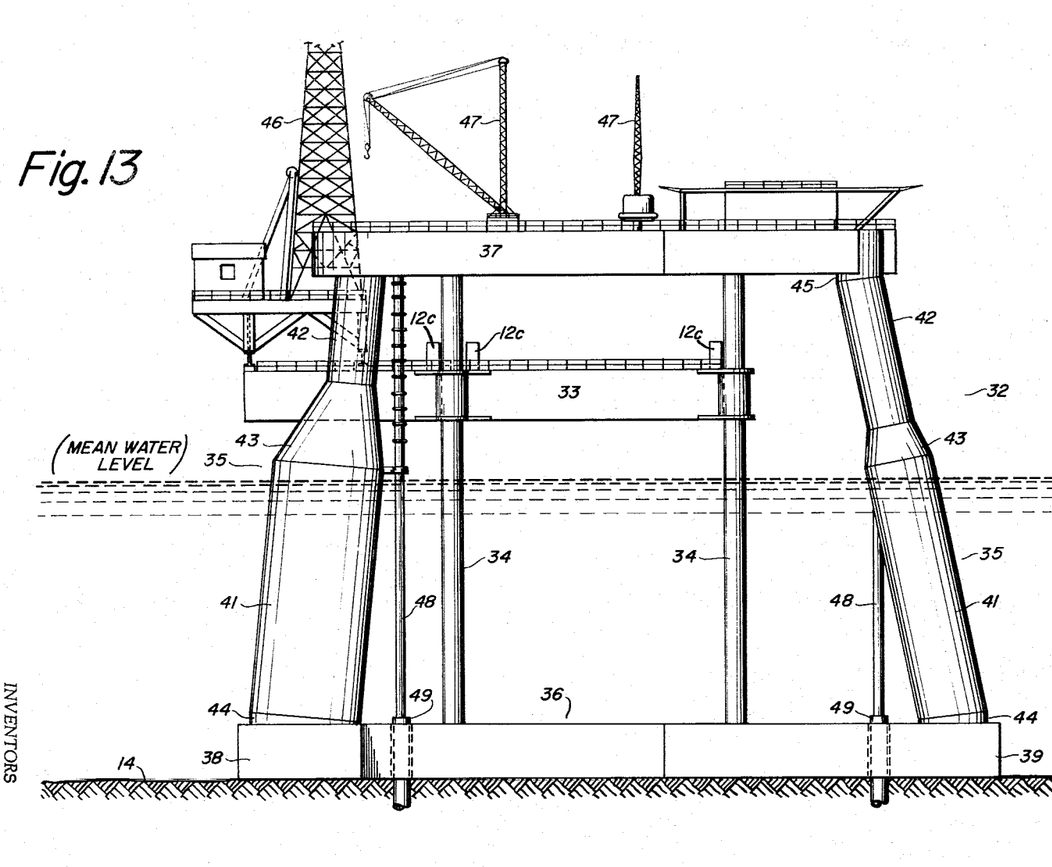
FIGURE 13 represents a side elevation of yet another modification of the apparatus of this invention, showing the modified apparatus set up for drilling operations at a marine site with the elevation of the operating stage adjusted relative to mean water level to provide proper clearance.
Figure 14:
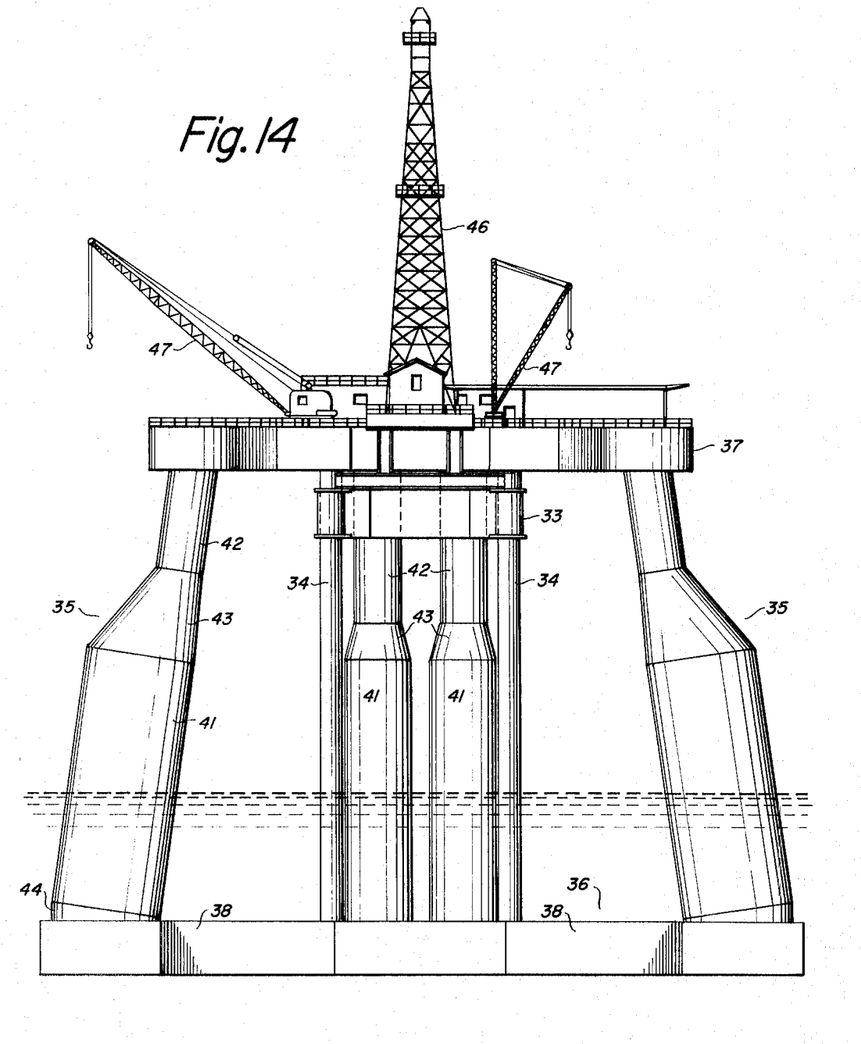
FIGURE 14 represents an end elevation of the modified apparatus of FIGURE 13, showing the apparatus afloat and the operating stage raised to its uppermost position, with the spuds and spudwells omitted for purposes of clarity.
Figure 15:
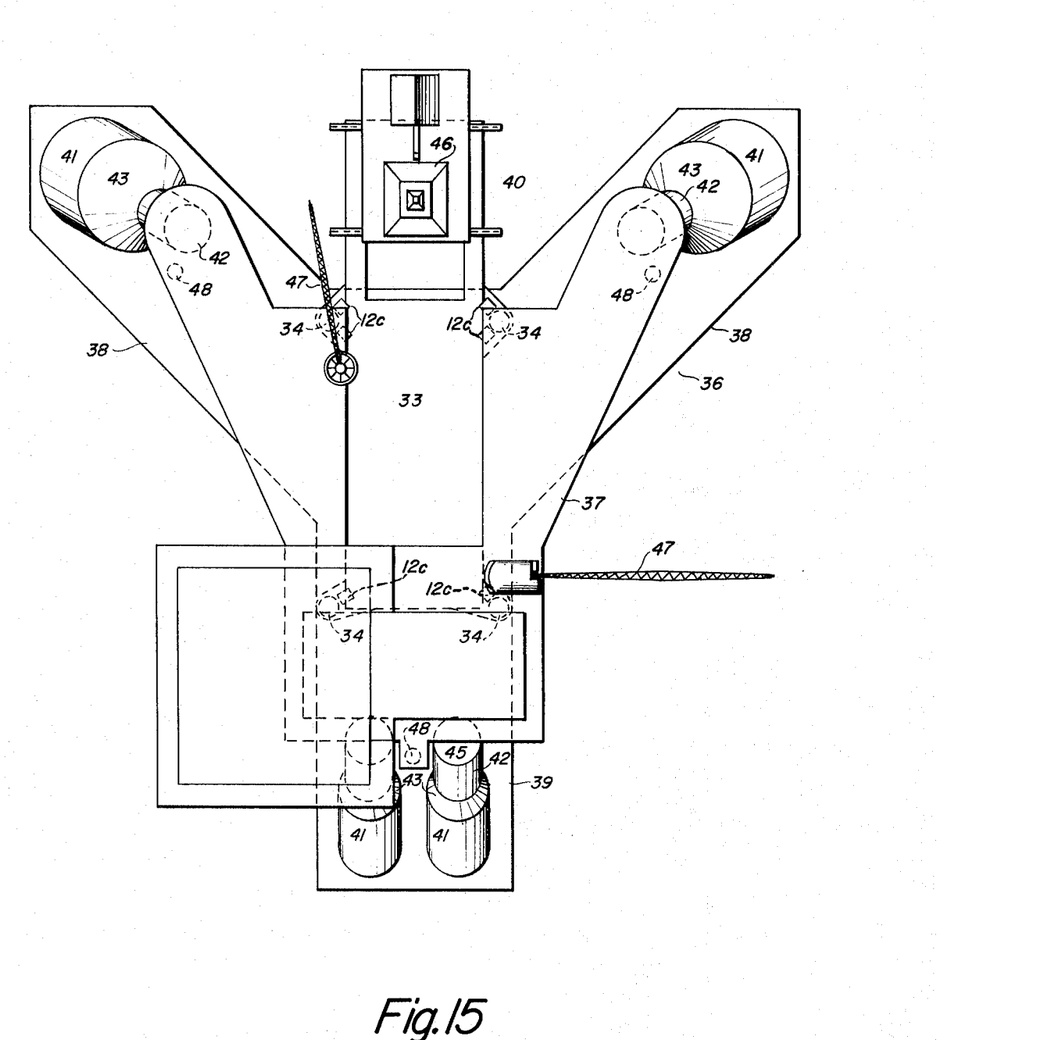
FIGURE 15 represents a view in plan of the modified apparatus of FIGURES 13 and 14.

Referring now to FIGURES 13–15, the modified mobile marine apparatus shown therein is seen as comprising primary structure 32 and operating stage 33 adjustably mounted thereto on guide members 34. Primary structure 32 is composed of inclined, buoyant, ballastable columns 35, a buoyant, ballastable base structure 36 integrating the lower ends of columns 35, and a useful-load-carrying superstructure 37 integrating the upper ends of columns 35. In this embodiment of the apparatus, there are four columns 35 in the primary structure 32, these four columns 35 are inclined to provide a broad lower end to the primary structure 32, and there is a vertical opening in said useful-load-carrying superstructure 37 through which practically all of the operating stage 33 is exposed, which opening affords communication between the upper decks of the useful-load-carrying superstructure 37 and operating stage 33.

As best shown in FIGURE 15, base structure 36 is composed of two arms 38 and another arm 39 arranged in the form of a "Y," the said two arms 38 defining a working area or recess 40 therebetween.

Columns 35 are composed of lower tubular portion 41, upper tubular portion 42 of smaller diameter than lower tubular portion 41, tapered tubular transition portion 43, tubular portion 44 tying lower tubular portion 41 into base structure 36, and tubular portion 45 tying upper tubular portion 42 into useful-load-carrying superstructure 37.

Means for ballasting and deballasting columns 35 and base structure 36 are so well known in the art that they need not be described in detail herein except to say that any suitable such means may be employed.

Jacking mechanisms 12c are mounted on operating stage 33 and operate on the guide members 34 to raise or lower operating stage 33 relative to the primary structure 32. As shown in the drawings, these guide members 34 are secured at their lower ends to base structure 36 and are secured at their upper ends to useful-load-carrying superstructure 37. These jacking mechanisms 12c may be any one of a number of types of jacking mechanisms well known in the art and are not described in detail herein, the said jacking mechanisms being shown only generally in the drawings.

The apparatus being intended primarily for drilling operations, derrick structure 46 is provided at one end of operating stage 33, which is superposed over working area or recess 40.

Useful-load-carrying superstructure 37 is provided with cranes 47 as shown.

Spuds 48 (shown only in FIGURES 13 and 15) may be extended through spud wells 49 in base structure 36 and into marine floor 14 to anchor the apparatus against lateral movement along the said marine floor 14.

The apparatus of FIGURES 13–15 is operated in the same manner as the apparatus of FIGURES 1–4.

Figures 16, 17, 18:
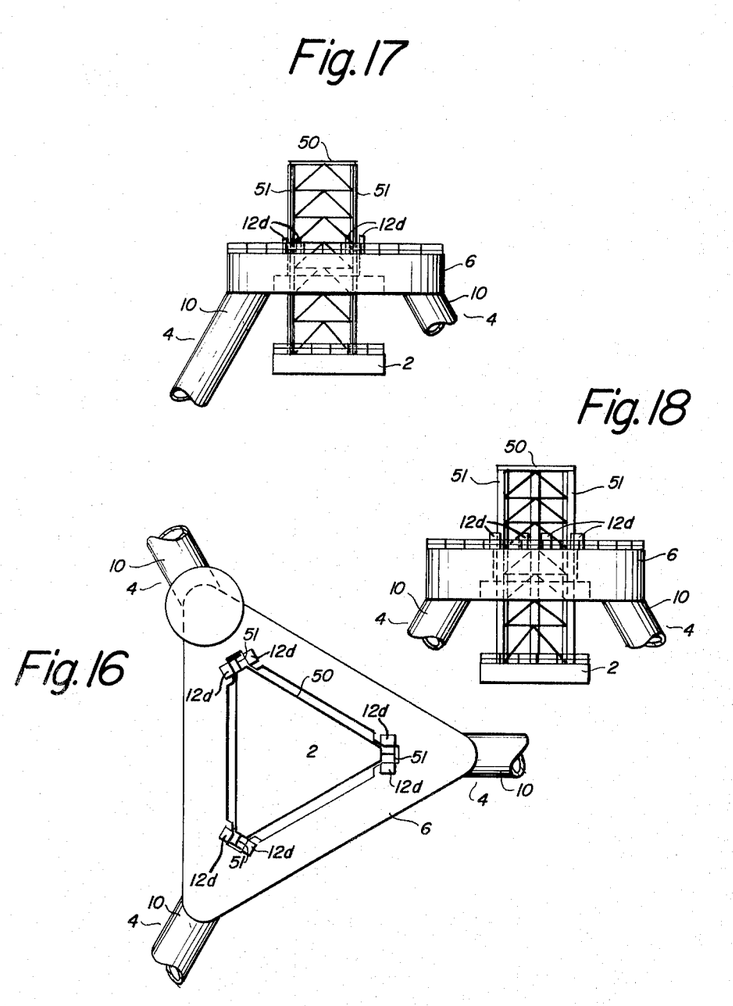
FIGURE 16 represents a partial view in plan of another modification of the apparatus of FIGURES 1-4.
FIGURE 17 represents a partial side elevation of the apparatus of FIGURE 16.
FIGURE 18 represents a partial end elevation of the apparatus of FIGURE 16.

Another modification of the apparatus shown in FIGURES 1–4 is disclosed in FIGURES 16–18. The derrick structure 50 is prismoidal, appearing in plan as a triangle. I-members 51 define the three corners or apices of the derrick structure and jacking mechanisms 12d on the useful-load-carrying superstructure 6 operate on I-members 51 to raise or lower operating stage 2. In this modification, no suspension members 3 are needed, as the derrick structure 50 is the only element required to be interposed between the said jacking mechanisms 12d and operating stage 2. In other respects, this modification is identical to the apparatus of FIGURES 1–4 and is operated in the same manner.

In all of the foregoing embodiments of this invention, it will be noted that the operating stage (2 in FIGURES 1–4, 9–12 and 16–18; 21 in FIGURES 5–8; 33 in FIGURES 13–15) is non-floating; that is to say that in normal operation, the operating stage is always above water.

The mobile marine apparatus has been shown in the several figures of this specification as grounded on the marine floor prior to carrying out whatever operations are desired. It is to be understood that this mobile marine apparatus need not be grounded on the marine floor and that operations therefrom can be conducted while the same is floating, suitable anchoring means (not shown) being supplied as is known to those familiar with the art; in this latter instance, the open or "transparent" construction of the mobile marine apparatus, with the deeply submerged mass of its columns and of its horizontally extended base structure, will provide a highly stable wind-and-wave resistant structure from which drilling operations can be conducted; alternatively, this structure, in any of the embodiments shown, can be used as a highly stable, wind-and-wave resistant floating drilling tender to be used alongside another drilling structure.

The term "jacking mechanism" as used herein is intended to include all means, of any kind whatsoever, capable of raising, lowering, and/or holding the operating stage to the primary structure in all of the embodiments of this specification, including, but not limited to, wire ropes and winches, etc. By way of example and not of limitation, jacking mechanisms 12, 12a, 12b, 12c and 12d may be of the type shown in British Patent 612,201 of 1948.

While we have disclosed the best embodiments of our invention now known to us, we do not wish to be limited to the exact structures shown and described, but may use such modifications, equivalents and substitutions as embraced within the scope of this specification or as pointed out in the claims.

The apparatus described herein may be varied in many ways without departing from the spirit of the invention. For example:

(a) In each sepcies, the least periphery of the base structure may be rectangular or trapezoidal in outline, and any other convenient shape therefor may be used as well, in place of the specific shapes therefor as shown herein.

(b) Likewise, the shape of the superstructure may be varied.

(c) The operating stage may or may not be arranged to nest in the superstructure, as desired, in respect to the several species herein.

We claim:

1. Mobile marine platform apparatus for use in water overlying a marine floor, said apparatus comprising:

(a) a first platform structure adapted to support supplies and equipment, (b) at least three stabilizing columnar members, each of length greater than the depth of water overlying the marine floor and each fixedly secured at its upper end to the said first platform structure, (c) a base structure fixedly secured to the lower ends of said columnar members, (d) said columnar members, base structure and first platform structure defining a stable primary structure adapted to float in said water with the first platform structure above the surface of the water, (e) said base structure being formed to provide a working recess extending inwardly from one edge thereof, (f) first means to controllably ballast said primary structure to lower said primary structure to the marine floor under conditions of controlled stability or selectively to controllably deballast said primary structure to raise said primary structure from the marine floor under conditions of controlled stability, (g) a second platform structure adapted to support supplies and equipment and positioned over said recess and below said first platform structure, (h) and second means rigidly and vertically adjustably securing said second platform structure to said primary structure whereby the elevation of said second platform structure relative to said primary structure and to the surface of the water may be varied.

2. Apparatus as in claim 1, further comprising:
(i) said first platform structure having a vertical opening therethrough for communication with said second platform structure, said vertical opening overlying at least a substantial portion of said second platform structure.

3. Apparatus as in claim 1, said second means comprising:
(i) a plurality of suspension members secured to said second platform structure and extending upwardly therefrom, and
(j) jacking means mounted on said first platform structure and operatively engageable with said suspension members to raise or selectively to lower said second platform structure relative to said primary structure,
said first platform structure being vertically apertured in way of said suspension members and said suspension members extending therethrough.

4. Apparatus as in claim 1, said second means comprising:
(i) a plurality of guide members secured at their lower ends to said base structure and secured at their upper ends to said first platform structure, and
(j) jacking means mounted on said second platform structure and operatively engageable with said guide members to raise or selectively to lower said second platform structure relative to said primary structure.

5. Apparatus as in claim 1, said first platform structure having a vertical opening extending therethrough, further comprising:
(i) a derrick structure mounted on said second platform structure and extending through the vertical opening in said first platform structure,
(j) vertical legs defining corners of said derrick structure,
said second means comprising:
(k) jacking means mounted on said first platform structure and operatively engageable with said vertical legs to raise or selectively to lower said derrick structure and said second platform structure relative to said primary structure.

6. Apparatus as in claim 1, said first platform structure having a vertical opening extending therethrough, further comprising:
(i) a derrick structure mounted on said second platform structure and extending through the vertical opening in said first platform structure,
(j) vertical legs defining corners of said derrick structure,
said second means comprising:
(k) jacking means mounted on said first platform structure and operatively engageable with said vertical legs to raise or selectively to lower said derrick structure and said second platform structure relative to said primary structure, said vertical legs being the sole elements secured to said second platform structure and engaged by said jacking means to adjust the elevation of said second platform structure relative to said primary structure.

7. Apparatus as in claim 2, said second platform structure being generally triangular in plan, and further comprising:
(j) a derrick structure mounted on said second platform structure and extending through said opening in said first platform structure, said derrick structure being triangular in plan,
(k) three vertical legs defining the three corners of said derrick structure, each of said legs being located adjacent one of the apices of said second platform structure,
said second means comprising:
(l) jacking means mounted on said first platform structure and operatively engageable with said vertical legs to raise or selectively to lower said derrick structure and said second platform structure relative to said primary structure.

8. Mobile marine platform apparatus for use in water overlying a marine floor, said apparatus comprising:
(a) a first platform structure adapted to support supplies and equipment,
(b) at least there stabilizing columnar members, each of length greater than the depth of water overlying the marine floor and each fixedly secured at its upper end to the said first platform structure, at least some of said columnar members being inclined relative to each other and diverging downwardly and outwardly away from each other with their lower ends extending beyond the vertical projection of the enclosing peripheral edge of said first platform structure,
(c) a base structure fixedly secured to the lower ends of all said columnar members,
(d) said columnar members, base structure and first platform structure defining a stable primary structure adapted to float in said water with the first platform structure above the surface of the water,
(e) said base structure being formed to provide a working recess extending inwardly from one edge thereof,
(f) first means to controllably ballast said primary structure to lower said primary structure to the marine floor under conditions of controlled stability or selectively to controllably deballast said primary structure to raise said primary structure from the marine floor under conditions of controlled stability,
(g) a second platform structure adapted to support supplies and equipment and positioned over said recess and below said first platform structure,
(h) and second means rigidly and vertically adjustably securing said second platform structure to said primary structure to maintain said second platform structure above the surface of the water and to vary the elevation of said second platform structure relative to said primary structure and to the surface of the water.

9. Apparatus as in claim 8, further comprising:
(i) said first platform structure having a vertical opening therethrough for communication with said second platform structure, said vertical opening overlying at least a substantial portion of said second platform structure.

10. Apparatus as in claim 8, said second means comprising:
(i) a plurality of suspension members secured to said second platform structure and extending upwardly therefrom, and
(j) jacking means mounted on said first platform structure and operatively engageable with said suspension members to raise or selectively to lower said second platform structure relative to said primary structure,
said first platform structure being vertically apertured in way of said suspension members and said suspension members extending therethrough.

11. Apparatus as in claim 8, said second means comprising:
(i) a plurality of guide members secured at their lower ends to said base structure and secured at their upper ends to said first platform structure, and
(j) jacking means mounted on said second platform structure and operatively engageable with said guide members to raise or selectively to lower said second platform structure relative to said primary structure.

12. Apparatus as in claim 8, said first platform structure having a vertical opening extending therethrough, further comprising:
- (i) a derrick structure mounted on said second platform structure and extending through the vertical opening in said first platform structure,
- (j) vertical legs defining corners of said derrick structure, said second means comprising:
- (k) jacking means mounted on said first platform structure and operatively engageable with said vertical legs to raise or selectively to lower said derrick structure and said second platform structure relative to said primary structure.

13. Apparatus as in claim 8, said first platform structure having a vertical opening extending therethrough, further comprising:
- (i) a derrick structure mounted on said second platform structure and extending through the vertical opening in said first platform structure,
- (j) vertical legs defining corners of said derrick structure, said second means comprising:
- (k) jacking means mounted on said first platform structure and operatively engageable with said vertical legs to raise or selectively to lower said derrick structure and said second platform structure relative to said primary structure, said vertical legs being the sole elements secured to said second platform structure and engaged by said jacking means to adjust the elevation of said second platform structure relative to said primary structure.

14. Apparatus as in claim 9, said second platform structure being generally triangular in plan, and further comprising:
- (j) a derrick structure mounted on said second platform structure and extending through said opening in said first platform structure, said derrick structure being triangular in plan,
- (k) three vertical legs defining the three corners of said derrick structure, each of said legs being located adjacent one of the apices of said second platform structure, said second means comprising:
- (l) jacking means mounted on said first platform structure and operatively engageable with said vertical legs to raise or selectively to lower said derrick structure and said second platform structure relative to said primary structure.

References Cited by the Examiner

UNITED STATES PATENTS

| | | | |
|---|---|---|---|
| 710,658 | 1/1903 | Becker | 61—46.5 |
| 720,998 | 2/1903 | Becker | 61—46.5 |
| 2,430,014 | 11/1947 | Hansen | 61—46.5 |
| 2,589,146 | 3/1952 | Samuelson | 61—46.5 |
| 2,857,744 | 10/1958 | Swiger et al. | 61—46.5 |
| 3,099,912 | 8/1963 | Wolff | 61—46.5 |
| 3,104,031 | 9/1963 | McCammon | 61—46.5 |
| 3,115,013 | 12/1963 | Thornley | 61—46.5 |

FOREIGN PATENTS 1,237,680   6/1960   France.

OTHER REFERENCES

"Column Stabilized Drilling Barges" by Robert M. Macy, a paper prepared for the Gulf Coast section of the Society of Naval Architects and Marine Engineers, Sept. 29, 1961.

Oil and Gas Journal, June 19, 1961, pp. 77–78.

CHARLES E. O'CONNELL, *Primary Examiner.*

EARL J. WITMER, *Examiner.*